INVENTORS.
BILLY E. CLAYBAUGH,
JAMES K. NICKERSON,
JOHN M. POWERS,

ATTORNEY.

3,396,087
DIMETHYLTEREPHTHALATE RECOVERY FROM PARAXYLENE FEED
Billy E. Claybaugh, James K. Nickerson, and John M. Powers, Baytown, Tex., assignors to Esso Research and Engineering Company
Filed Jan. 10, 1966, Ser. No. 519,765
1 Claim. (Cl. 203—6)

ABSTRACT OF THE DISCLOSURE

A feed solution of dimethylterephthalate (DMT) in paraxylene containing methylparatoluate (MPT) and high boiling impurities is distilled at 200 to 300 mm. Hg pressure to recover purified DMT by charging the feed solution to a distillation tower and recovering p-xylene as an overhead fraction, purified DMT being recovered as an intermediate fraction and high boiling impurities are discarded as bottoms. The DMT is prevented from solidifying in the column by maintenance of a specified amount of MPT in the column by introduction of MPT with the feed and by recycling MPT withdrawn from above the feed inlet to the feed inlet.

---

Figure 1:
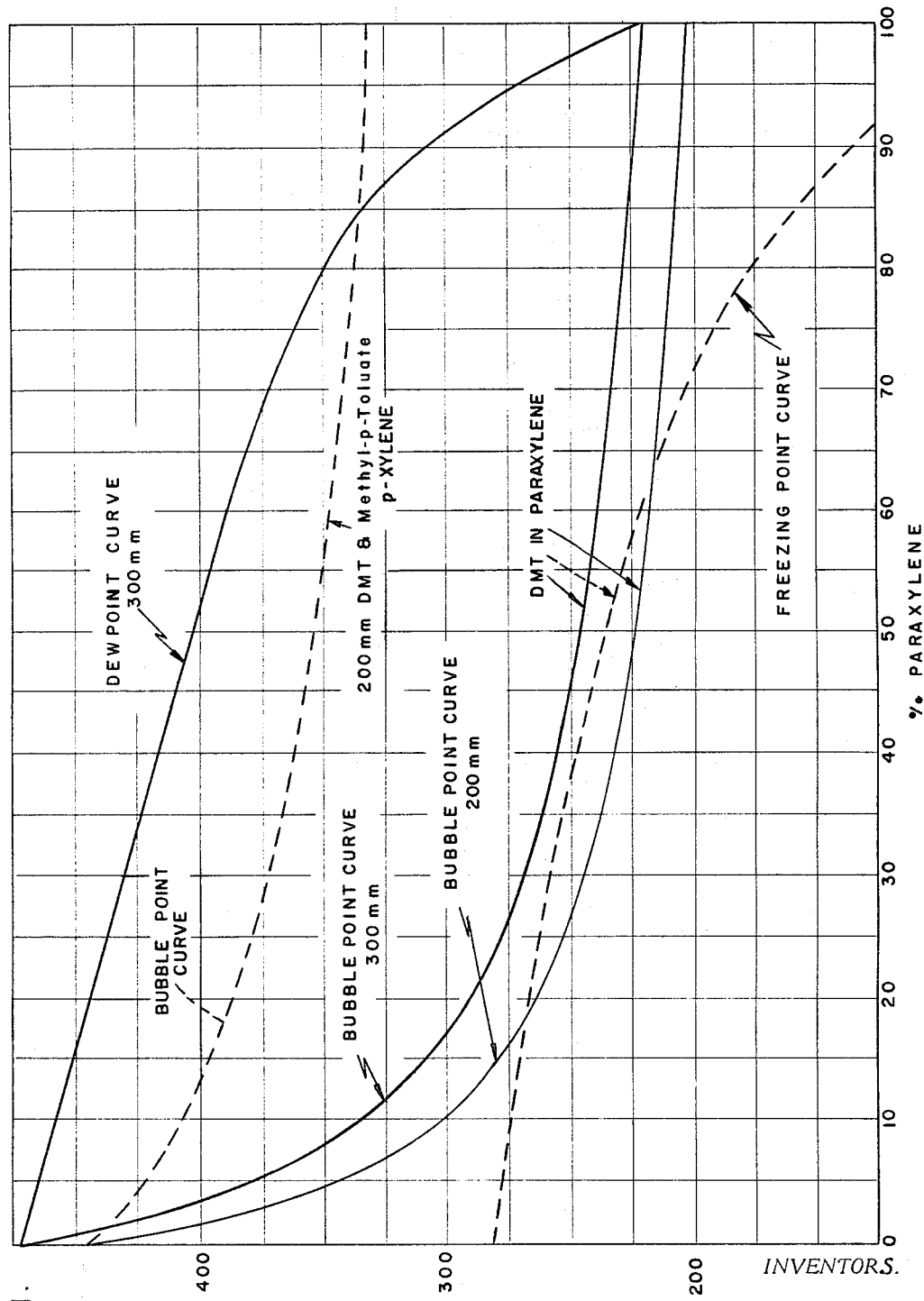

The present invention is directed to the separation of impurities from crystallizable components. More particularly, the invention is concerned with the separation of high boiling impurities from sublimable, crystallizable components by distillation at reduced pressure. In its more specific aspects, the invention is concerned with the purification of sublimable, crystallizable components in a vaporizable solvent by distillation to prevent crystallization of the crystallizable component in distillation and allied equipment.

The present invention may be briefly described as the separation of high boiling impurities from a sublimable, crystallizable component in solution in a vaporizable solvent by distillation at reduced pressure in a distillation zone. At a point intermediate the first and second end of the distillation zone, to prevent crystallization of the crystallizable component in the distillation zone and its allied or auxiliary equipment, there is maintained in the distillation zone a sufficient amount of a component having a boiling point intermediate the sublimation temperature of the crystallizable component and the boiling point of the solvent to prevent crystallization of the crystallizable component. The solution is distilled to remove from the zone the solvent as an overhead fraction and the crystallizable component as an intermediate fraction while the high boiling impurities are withdrawn from the zone as a bottoms fraction. The intermediate boiling component is maintained in the zone at a point where the concentration of the crystallizable component at the prevailing temperature of said zone is sufficient for crystallization.

The intermediate boiling point component is maintained in the zone preferably by circulating the intermediate boiling component in the distillation zone from a point above the introduction point of the crystallizable component containing the impurities to the point where the crystallizable component containing the impurities is introduced.

The present invention is particularly applicable to purification of dimethylterephthalate (DMT) in solution in paraxylene in which the DMT contains high boiling impurities such as monomethylterephthalate and terephthalic acid. The intermediate boiling point component is suitably methylparatoluate.

The methyl paratoluate may be maintained in the distillation zone in a concentration from about 5% to about 75% based on the amount of DMT present in the distillation zone at a particular level therein.

The pressure within the distillation zone is maintained at a reduced pressure to prevent and avoid decomposition of the material being separated. For example, if atmospheric pressure were employed, it would be necessary to distill the mixture at a relatively high temperature which may result in decomposition or thermal degradation of the crystallizable component impurities and/or the solvents, particularly in the heating zone such as a reboiler. A pressure within the range from about 10 to about 400 mm. Hg may be employed.

Temperatures may range from about 150° to about 500° F. at the reduced pressures outlined herein and depending on the composition on a given tray.

The invention will be illustrated further by reference to separation of DMT from its impurities, but it is equally applicable to separation of other crystallizable components, examples of which are neopentyl glycol, orthophthalic anhydride, and the like.

Likewise, other solvents besides paraxylene may be used and examples thereof are benzene, toluene, ortho- and meta-xylene, methanol or mixtures of the several solvents.

Also, other intermediate boiling components may be used such as, but not limited to methyl benzoate, n-nonane, di-isobutyl ketone, isopropyl benzene, n-propyl benzene and the like.

Figure 2:
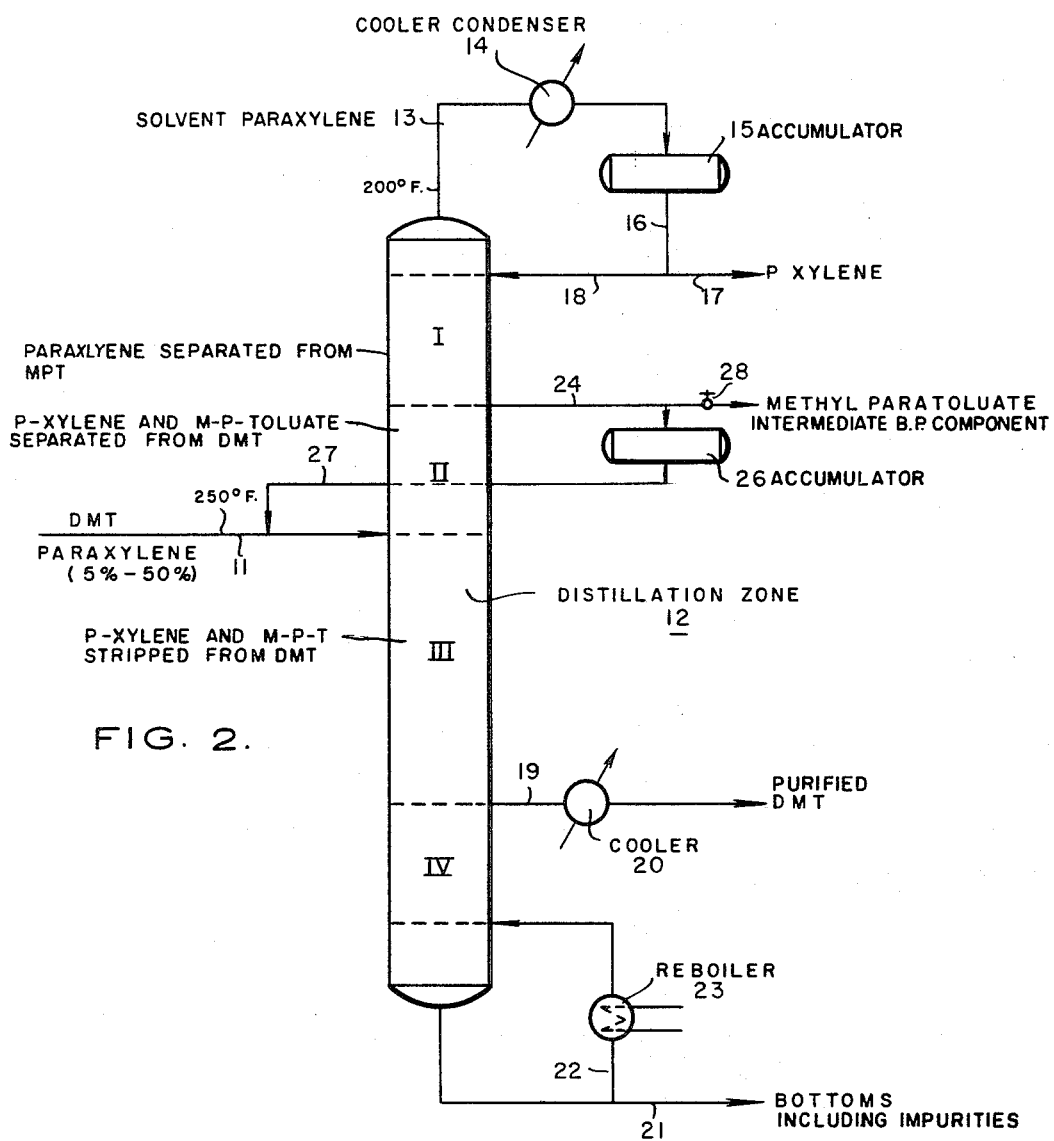

The present invention will be further illustrated by reference to the drawing in which a best mode and embodiment contemplated are set forth in which:

FIGURE 1 illustrates a freezing point curve superimposed on dew point and bubble point curves at reduced pressure; and FIGURE 2 is a flow diagram illustrating separation of impurities from DMT.

Referring now to the drawing, and particularly to FIGURE 1, reference is had to a solution of DMT in paraxylene. It will be seen that at 300 mm. Hg pressure the bubble point curve for the mixture at the temperature of a boiling mixture is above the freezing point curve at all concentrations and no solidification occurs within a distillation tower. At 200 mm. Hg pressure, and below the boiling point of paraxylene, the DMT liquid mixture may be below the freezing point of the mixture. As a result, solidification occurs and the distillation tower becomes inoperative. Reference to the curve showing the bubble point of a solution containing paraxylene, DMT and methyl paratoluate at 200 mm. pressure shows that the mixture has a boiling point substantially above that of the DMT and paraxylene at 300 mm. and 200 mm. pressure.

Thus, in accordance with the present invention, solidification of a DMT-paraxylene mixture during separation by distillation at reduced pressures may be prevented by maintenance of a third component of an intermediate boiling point such as methyl paratoluate within the distillation tower. This may be accomplished by adding methyl paratoluate to the feed to the tower or recirculating and maintaining the methyl paratoluate within the tower at a particular selected level. The particular selected level may be at any point in the tower where the concentration of DMT and the temperature requires the presence of an intermediate boiling component. Thus, the third component, by being maintained within the tower, raises the boiling point of the three-component mixture to a point where solidification does not occur.

This will be illustrated further by referring to FIGURE 2 in which numeral 11 designates a feed line by way of which a DMT mixture containing from about 5% to about 50% paraxylene is introduced into a distillation zone 12 from a source (not shown). The source of the solution of DMT and paraxylene may suitably be an operation wherein DMT is formed in the oxidation-esterification of paraxylene in the presence of methyl alcohol. The feed mixture introduced into zone 12 is subjected to distillation temperatures within the range given and at reduced pressures within the range given to cause the removal as an overhead fraction of paraxylene by way of line 13 containing a cooler-condenser 14 which discharges the paraxylene into an accumulator 15 from which the paraxylene is withdrawn by way of line 16 with paraxylene being recovered by line 17 for return to the oxidation-esterification zone and recycled to distillation zone 12 by line 18 as reflux.

Purified DMT is removed in a liquid form from zone 12 by way of line 19 containing a cooler 20 which reduces its temperature sufficiently but yet allows it to be maintained in a liquid phase. A bottoms product is withdrawn from zone 12 by line 21 containing impurities. This fraction will be comprised of DMT with the impurities concentrated therein. Heat is supplied to the zone 12 by recirculating a portion of the bottoms fraction by way of line 22 containing a heater or reboiler 23 back to zone 12.

The feed introduced by line 11 may suitably contain methyl paratoluate which is one of the oxidation products and the concentration of methyl paratoluate is maintained in the zone 12 by withdrawing as a side stream by way of line 24 methyl paratoluate which is discharged by line 25 into an accumulator 26 from whence the methyl paratoluate is returned to feed line 11 and thence to zone 12 by line 27.

Zone 12 is shown divided into 4 sub-zones I, II, III and IV. In sub-zone I, paraxylene is separated from methyl paratoluate. In sub-zone II, paraxylene and methyl paratoluate are separated from DMT. In sub-zone III, paraxylene and methyl paratoluate are stripped from the DMT so that a purified stream of DMT may be recovered by line 19 from sub-zone IV, with the bottoms fraction containing the impurities being discharged by line 21 as has been described.

It will be noted that line 24 is provided with a valve 28 by way of which methyl paratoluate may be discharged from the system if a stream containing methyl paratoluate is continuously introduced. Thus, discharge of methyl paratoluate prevents buildup of methyl paratoluate within the tower. Otherwise, if there is no new addition of methyl paratoluate, it can be recycled without discharge.

While the distillation zone is shown as one distillation tower, it is to be understood that there may be two, three or four distillation towers each containing one or more sub-zones as illustrated. It is preferably to employ a distillation zone comprised of one tower.

The present invention is quite important and useful in that distillation towers for purifying DMT may be operated at low temperatures and pressures without the formation of a solid phase within the distillation column or within auxiliary and/or allied equipment. Thus, the present invention is quite important and useful.

The nature and objects of the present invention having been completely described and illustrated, and the best mode and embodiment contemplated set forth. What we wish to claim as new and useful and secure by Letters Patent is:

1. In the separation of high boiling impurities from dimethylterephthalate in solution in about 5% to about 50% paraxylene by distillation at reduced pressure in a distillation zone in which said solution of dimethylterephthalate containing said high boiling impurities and methylparatoluate is introduced into said zone at a point intermediate its first and second ends, the improvement which comprises:

maintaining in said zone a sufficient amount of methylparatoluate within the range from about 5% to about 75% based on the amount of dimethylterephthalate present in said zone at a particular point therein where the concentration of said dimethylterephthalate at the prevailing temperature of said zone is sufficient for crystallization;

distilling said solution at a pressure within the range between 200 to 300 mm. Hg and at a temperature sufficient to prevent crystallization of said dimethylterephthalate at said pressure and to remove from said zone said paraxylene as an overhead fraction and purified dimethylterephthalate as an intermediate fraction; and withdrawing said high boiling impurities from said zone as a bottoms fraction;

said methylparatoluate being maintained in said zone in said amount by continuously withdrawing methylparatoluate from said zone at a point above the point where the solution of dimethylterephthalate and high boiling impurities is introduced and below the point where the overhead fraction of paraxylene is removed; and recycling to said zone at the point where the solution of dimethylterephthalate and high boiling impurities is introduced at least a portion of said withdrawn methylparatoluate.

References Cited

UNITED STATES PATENTS

| | | | |
|---|---|---|---|
| 2,646,393 | 7/1923 | Hughes et al. | 260—475 |
| 2,992,168 | 7/1961 | Wilson et al. | 260—475 |
| 3,103,470 | 9/1963 | Wilson et al. | 203—69 |
| 3,227,743 | 1/1966 | Shaw et al. | 260—475 |

NORMAN YUDKOFF, *Primary Examiner.*

J. SOFER, *Assistant Examiner.*